(12) United States Patent
Wolff

(10) Patent No.: US 12,038,415 B2
(45) Date of Patent: Jul. 16, 2024

(54) FORCE MEASURING ARRANGEMENT, FORCE MEASURING APPARATUS HAVING SUCH A FORCE MEASURING ARRANGEMENT, AND METHOD USING SUCH A FORCE MEASURING ARRANGEMENT

(71) Applicant: Vetter Pharma-Fertigung GmbH & Co. KG, Ravensburg (DE)

(72) Inventor: Michael Wolff, Gestratz (DE)

(73) Assignee: Vetter Pharma-Fertigung GmbH & Co. KG, Ravensburg (DE)

( * ) Notice: Subject to any disclaimer, the term of this patent is extended or adjusted under 35 U.S.C. 154(b) by 473 days.

(21) Appl. No.: 17/312,281

(22) PCT Filed: Dec. 6, 2019

(86) PCT No.: PCT/EP2019/083931
§ 371 (c)(1),
(2) Date: Jun. 9, 2021

(87) PCT Pub. No.: WO2020/120300
PCT Pub. Date: Jun. 18, 2020

(65) Prior Publication Data
US 2022/0107252 A1   Apr. 7, 2022

(30) Foreign Application Priority Data
Dec. 10, 2018 (DE) ...................... 10 2018 221 337.2

(51) Int. Cl.
*G01N 3/08* (2006.01)
*G01L 5/00* (2006.01)

(52) U.S. Cl.
CPC .............. *G01N 3/08* (2013.01); *G01L 5/0038* (2013.01); *G01N 2203/0017* (2013.01); *G01N 2203/0019* (2013.01); *G01N 2203/0423* (2013.01)

(58) Field of Classification Search
CPC ............. G01N 3/08; G01N 2203/0017; G01N 2203/0019; G01N 2203/0423; G01N 2203/0206; G01N 2203/047; G01L 5/0038

(Continued)

(56) References Cited

U.S. PATENT DOCUMENTS 5,821,407 A   10/1998   Sekiguchi et al.
6,370,962 B1 *  4/2002   Sullivan .................. G01N 3/08
                                                                    73/833

(Continued)

FOREIGN PATENT DOCUMENTS

DE           20314761 U1   12/2003
DE   10 2008 050 465 A1    6/2010

(Continued)

OTHER PUBLICATIONS

Office Action dated Jul. 4, 2023 for Japanese Application No. 2021-532363. 15 pages.

(Continued)

*Primary Examiner* — Octavia Davis Hollington
(74) *Attorney, Agent, or Firm* — Sheppard Mullin Richter & Hampton LLP

(57) ABSTRACT

The invention relates to a force measuring arrangement (3) in particular for applying a test parameter to a specimen and/or for measuring a resistance force applied by the specimen, having at least one force absorption element (25), a first fastening device and a force transmission element (27), wherein the force absorption element (25) can be (Continued)

Figure 1:
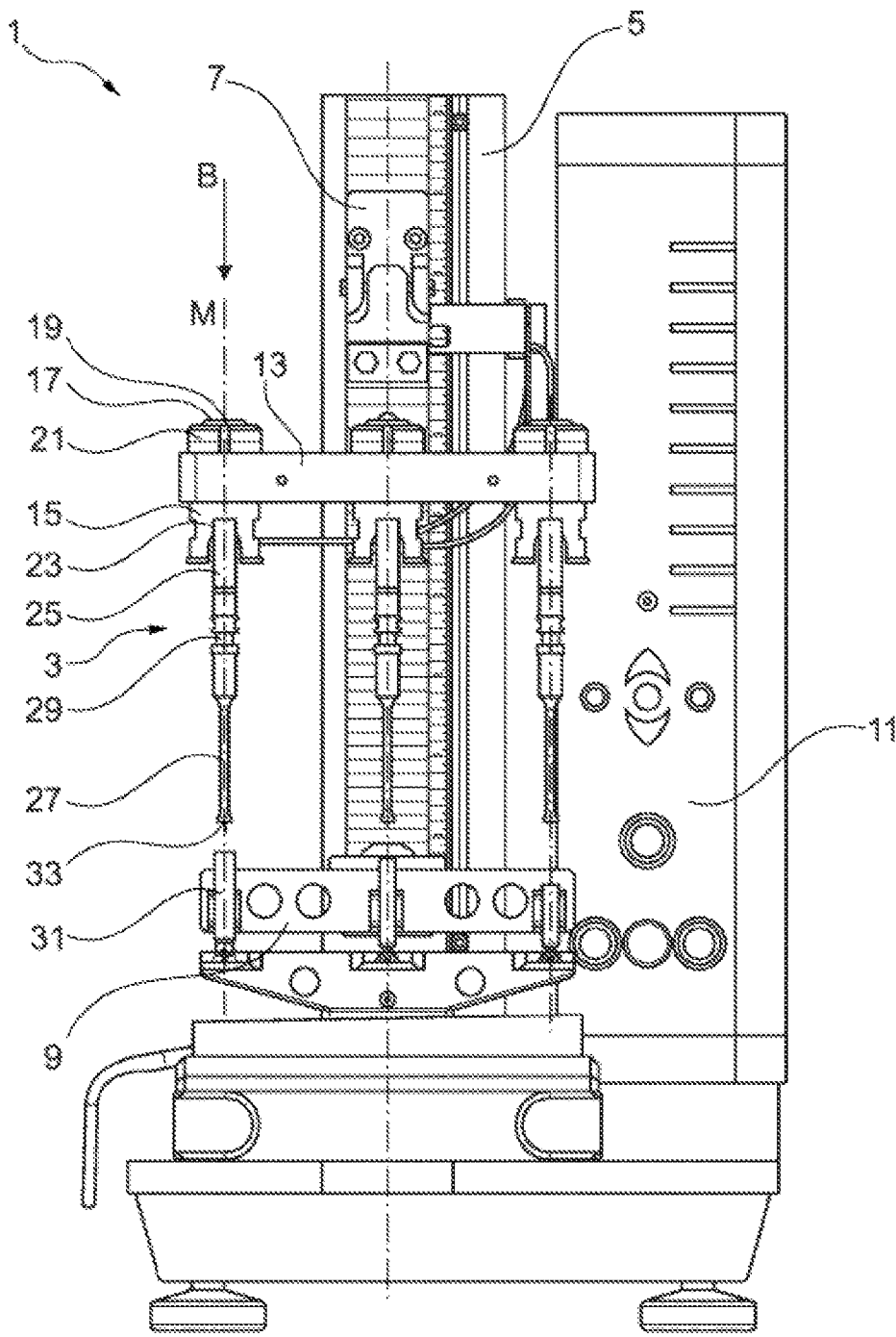

fastened to a force measuring device in a movable manner by means of the first fastening device, wherein the force absorption element (25) is designed to measure a relative force acting between two force absorption regions, namely a first force absorption region and a second force absorption region (51), wherein the first fastening device is able to be connected to the force absorption element (25) in a force-transmitting manner via the first force absorption region, wherein the second force absorption region (51) is able to be connected to the force transmission element (27) in a force-transmitting manner by means of a second fastening device, wherein the force transmission element (27) is designed to apply a test parameter to a specimen. The force measuring arrangement is notable in that the second fastening device has a magnet (37) that is designed to retain the force transmission element (27) at least in a state connected to the second force absorption region (51) in a force-transmitting manner.

15 Claims, 2 Drawing Sheets

(58) Field of Classification Search
USPC .......................................................... 73/818
See application file for complete search history.

(56) References Cited

U.S. PATENT DOCUMENTS

| | | | |
|---|---|---|---|
| 2009/0185187 A1* | 7/2009 | Crist | G01N 21/8507 356/436 |
| 2010/0122572 A1* | 5/2010 | Scherzinger | G01N 3/42 73/81 |
| 2016/0011083 A1 | 1/2016 | Barnes et al. | |
| 2021/0116344 A1* | 4/2021 | Fischer | G01N 3/46 |
| 2022/0107248 A1* | 4/2022 | Wolff | G01L 5/0028 |

FOREIGN PATENT DOCUMENTS

| | | |
|---|---|---|
| DE | 10 2013 001 561 A | 7/2014 |
| KR | 20100115625 A * | 10/2010 |
| WO | 95/09353 A1 | 4/1995 |
| WO | 1999032870 A1 | 7/1999 |
| WO | 2012119118 A2 | 9/2012 |
| WO | 2019/110778 A1 | 6/2019 |

OTHER PUBLICATIONS

International Search Report and Written Opinion for PCT/EP2019/083931 dated Mar. 11, 2020, 14 pages. English translation of ISR only.

* cited by examiner

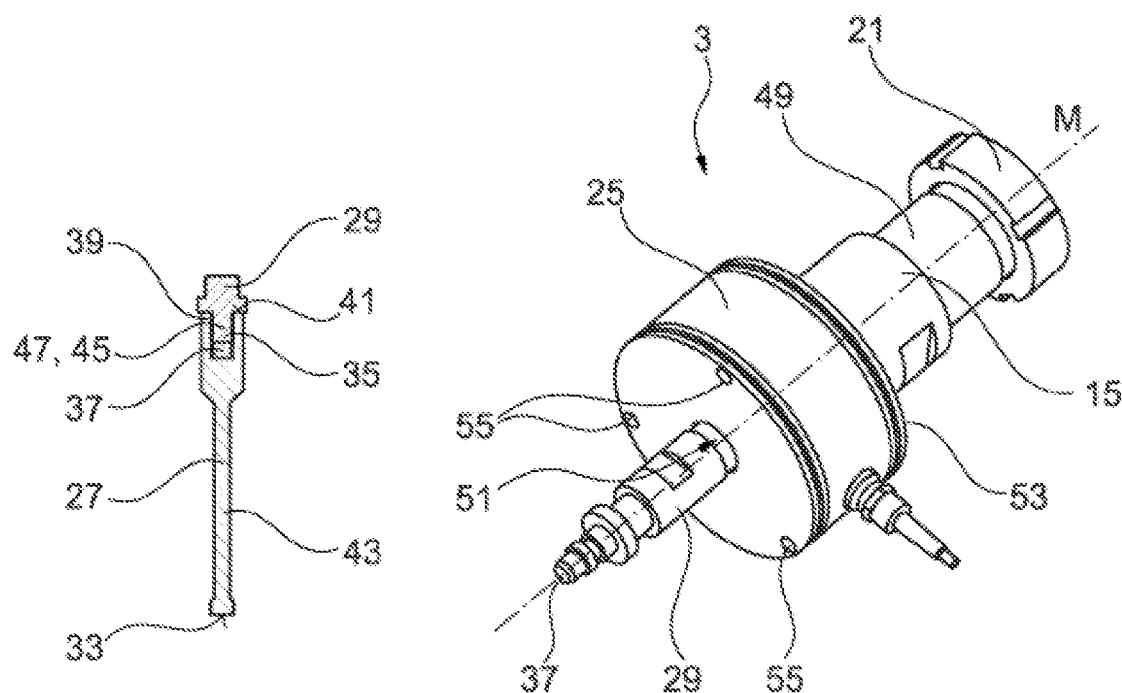
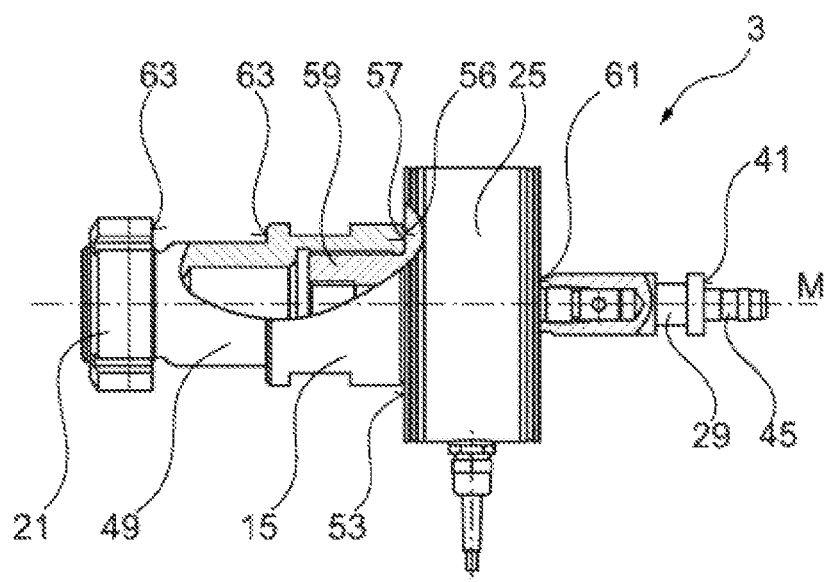

FORCE MEASURING ARRANGEMENT, FORCE MEASURING APPARATUS HAVING SUCH A FORCE MEASURING ARRANGEMENT, AND METHOD USING SUCH A FORCE MEASURING ARRANGEMENT

CROSS-REFERENCE TO RELATED APPLICATIONS

This application is a U.S. National Stage Application under 35 U.S.C. § 371 of International Application No. PCT/EP2019/083931, filed Dec. 6, 2019, which claims priority to DE 10 2018 221 337.2, filed Dec. 10, 2018, the contents of which are incorporated to the present disclosure by reference.

The invention relates to a force measuring arrangement in particular for applying a test parameter to a specimen and/or for measuring a resistance force applied by the specimen, a force measuring device having such a force measuring arrangement and a method with such a force measuring arrangement.

Force measuring arrangements and methods with such a force measuring arrangement are already known. These comprise a force absorption element, which is mounted in a movable manner, in particular a load cell, for determining a force which acts between two force absorption regions of the force absorption element. In this case, a force is applied to the force absorption element in a direction of application via a first force absorption region, which usually causes a movement of the force absorption element in the direction of a specimen. To interact with the specimen, the force absorption element is connected to a force transmission element via a second force absorption region, so that when interacting with the specimen, in particular through direct contact of the force transmission element with the specimen, a resistance force originating from the specimen is caused, which is introduced via the second force absorption region into the force absorption element and counteracts the force introduced via the first force absorption region. The force absorption element is designed to measure the relative force acting between the two force absorption regions. With knowledge of the force acting via the first force absorption region and by measuring the relative force acting on the force absorption element, the resistance force caused by the specimen can thus be measured.

Connecting elements, in particular the force transmission element and adapter elements serving to fasten the force transmission element to the second force absorption region, between the second force absorption region and the specimen are designed to be rigid, at least in relation to the relative force caused, so that they do not yield significantly elastically or plastically under load.

Typically, the force transmission element is held on such an adapter element by means of a pin, wherein the adapter element is screwed onto the second force absorption region. In order to hold the force transmission element on the adapter, the pin is pushed through a bushing in the force transmission element and a further bushing in alignment with it in the adapter, and a pressing force is applied from the adapter element by means of a knurled screw in such a way that the force transmission element is pressed against the pin with an inside of the bushing of the force transmission element, so that the force transmission element is held securely, in particular by clamping, on the adapter piece. In particular when a force is measured in a medicament container, the components involved in the force measuring device are made very small so that they can penetrate into the medicament container and, in particular, act on a plug element arranged therein. As a result of this dimensioning of the force measuring device and the small dimensioning of the pin following from this, the pin gets often lost when handling the force measuring arrangement, so that a corresponding replacement part is required. In addition, an additional work step for fixing the force transmission element, namely the actuation of the knurled screw, is necessary. The force transmission element is also susceptible to tilting, in particular in the lateral direction, that is to say transversely, in particular perpendicular, to the direction of application, as a result of which a force measurement is falsified.

In addition, the force absorption element is screwed to an adapter plate in the first force absorption region by means of a central screw that is aligned with the direction of application. This leads to further inaccuracies.

The adapter plate, for its part, is fastened to a slide part of a force measuring tower via an angle, wherein the angle holds the adapter plate at a distance from the force measuring tower in the horizontal direction. The slide part can be moved along the force measuring tower, so that the adapter plate and thus the force absorption element can be displaced in the direction of extension of the force measuring tower, that is, in the vertical direction. Such a movement, in particular a downward movement, allows a test parameter to be applied to a specimen by means of the force transmission element. The fastening between the adapter plate and the force measuring tower via the bracket is also typically implemented by means of a pin, which also leads to inaccuracies in the measurement at this point.

The accuracy is particularly important for force measurements in or on medicament containers and even extremely small inaccuracies mean that the force measurement has to be repeated. The known force measuring arrangements do not adequately meet these high accuracy requirements.

The object of the invention is to create a force measuring arrangement, wherein the disadvantages mentioned are avoided.

The object is achieved by creating the subject matter of the independent claims. Advantageous configurations follow from the dependent claims.

The object is achieved in particular by creating a force measuring arrangement, in particular for applying a test parameter to a specimen and/or for measuring a resistance force applied by the specimen, having at least one force absorption element, a first fastening device and a force transmission element, wherein the force absorption element can be fastened, in particular is fastened, to a force measuring device in a movable manner by means of the first fastening device, wherein the force absorption element is designed to measure a relative force acting between two force absorption regions, namely a first force absorption region and a second force absorption region, wherein the first fastening device is able to be connected to the force absorption element in a force-transmitting manner via the first force absorption region, wherein the second force absorption region is able to be connected to the force transmission element in a force-transmitting manner by means of a second fastening device, wherein the force transmission element is designed to apply a test parameter to a specimen. The force measuring arrangement is notable in that the second fastening device has a magnet that is designed to retain the force transmission element, at least in a state connected to the second force absorption region in a force-transmitting manner A simple fastening mechanism is thus created which connects the force transmission element to the force absorption element in a force-transmitting manner, in particular without screws or other correspondingly complex work steps. In this way, rounded contact surfaces, such as those occurring in the region of a circumferential surface of a screw and/or a pin, are avoided in particular. As a result, the stability of the force measuring device is also high.

A force absorption element is understood to mean, in particular, a measuring device which is designed by means of a sensor to measure a tensile and/or compressive force between the first force absorption region and the second force absorption region. The force absorption element is preferably designed as a load cell.

A force transmission element is understood here to mean in particular an element which consists of a rigid material, that is, a material that is rigid, when the force measuring arrangement is used as intended, or which element at least creates a connection between the second force absorption region and an application point, which is designed to come into engagement with the specimen, when the force measuring arrangement is used as intended.

The force transmission element is preferably designed as a rod and/or ram, which is designed to penetrate into the specimen, in particular into a cylindrical hollow body. The force transmission element preferably has an end face having the point of application for applying a test parameter to the specimen, which end face is preferably flat and, when properly installed in the force measuring arrangement and when the specimen is correspondingly installed in the force measuring arrangement as intended, faces the specimen in such a way that the end face is arranged parallel to an application surface of the specimen.

A test parameter is understood here to mean, in particular, a force, an impulse, a speed, a mass and/or an effective time. It is important that the test parameter can be used as a measure for a force to be measured, preferably converted into such a force. The test parameter can thus be used as an input variable to act on the specimen. The resistance force to be determined, which is preferably determined as a function of the input variable, that is to say the test parameter, is preferably a variable that corresponds to the test parameter, in particular a force and/or a pressure.

The first and/or second fastening device is preferably designed as a separate adapter element which can be fastened to the force absorption element, in particular in one of the force absorption regions. In addition, the first fastening device can be fastened to the force measuring device, which is in particular arranged in a stationary manner, in such a way that the first fastening device and/or the force absorption element can be moved with respect to the force measuring device. The second fastening device is preferably designed to fasten the force transmission element to the fastening device. This fastening is at least partially, preferably exclusively, brought about by the magnet.

Alternatively, the first fastening device is designed in one piece with the force absorption element and/or the force measuring device and/or the second fastening device is designed in one piece with the force transmission element and/or the force absorption element. In this case, too, it is provided that the second fastening device has a magnet which is designed to hold the force transmission element on the second force absorption region of the force absorption element. In this case, the magnet can be formed on the side of the force transmission element, in particular in one piece with it, or on the side of the force absorption element, in particular in one piece with it. It is important that, when the force transmission element is properly connected to the second force absorption region, it interacts with a metal and/or a further magnet on the opposite side in order to hold the force transmission element on the force absorption element.

According to a further development of the invention it is provided that the second fastening device is designed as a separately designed, second, in particular lower adapter piece. Thus, the second fastening device is matched individually to the force transmission element. In particular, this means that already known load cells can be used which usually do not have a magnet, in that the magnet is arranged on the second fastening device, that is to say on the second adapter piece.

The second adapter piece is preferably arranged below the force absorption element in the direction of gravity. Alternatively, however, it is also possible for it to be arranged above or to the side of the force absorption element.

The second adapter piece can preferably be connected to the force absorption element in the second force absorption region by being screwed at its end facing the force absorption element, when installed in the intended position, wherein the second force absorption region particularly preferably comprises a second counter contact surface and the second adapter piece has a second contact surface, wherein the second contact surface and the second counter contact surfaces are designed to abut flat against one another at least in some regions and thereby to form an in particular circular ring-shaped contact surface. The second contact surface and/or the second counter contact surface are preferably arranged symmetrically and perpendicular to the direction of application, at least when a force is applied. At its end facing away from the force absorption element, the adapter piece preferably has a magnet by means of which the force transmission element can be held on the adapter piece.

A direction of application is understood here to mean in particular a direction in which the force to be acting on the first force absorption region, that is to say in particular a force originating from the force measuring device, especially the force measuring tower, is directed. This direction preferably coincides with a central axis of the force measuring device, in particular of the force absorption element, the second adapter piece and/or the force transmission element. The direction of application is particularly preferably aligned in the direction of gravity, that is, vertically downwards. Furthermore, the direction of application is preferably aligned perpendicular to the end face of the force transmission element.

According to a further development of the invention, it is provided that the force transmission element is pushed against a preferably flat support surface of the force measuring arrangement by means of the magnet. This ensures an optimal application of force and the accuracy of the force measuring arrangement is high.

In this case, a counter-support surface of the force transmission element is pushed, in particular pulled, by the magnetic holding force, preferably in the second force absorption region, against the force absorption element and/or against the second fastening device, in particular the second adapter piece, whereby here preferably a circular ring-shaped, flat contact between the force transmission element and the second adapter piece is formed. The support surface is preferably exclusively flat and/or formed on the force absorption element and/or on the second adapter piece, wherein the support surface particularly preferably does not comprise any steps or bevels. In addition, there is preferably only one continuous flat contact between the force transmission element and the force absorption element.

According to a further development of the invention, it is provided that the specimen is designed as a medical hollow body, in particular a medicament container, with a plug element and the force transmission element is designed to at least partially penetrate into an internal volume of the medical hollow body, and therein to act on the plug element preferably in the direction of application. The holding forces of the plug element in the inner volume of the medical hollow body can thus be reliably checked by means of the force measuring device. Particularly with such medical hollow bodies, it is important that the holding forces are checked particularly precisely and without deforming the plug, since the deformation would lead to changed holding forces in the hollow body, so that the force measurement can in this case no longer measure the actual holding forces of the undeformed plug.

The force transmission element thus acts on the plug element with its end face directed in the direction of application, wherein the direction of application preferably is oriented perpendicular to the end face.

A medical hollow body is understood here to mean in particular a syringe, a carpule, an ampoule and/or a vial.

According to a further development, it is provided that the force transmission element has a longitudinal extent which, together with a longitudinal extent of the plug element, is matched to a longitudinal extent of the inner volume or is greater than this. It is thus possible for the force transmission element to easily penetrate completely through the inner volume of the medical hollow body, so that a maximum displacement path of the plug element can be checked during the force measurement.

The force transmission element preferably has a rod-shaped extension which corresponds to this length. The rod-shaped extension, in particular its end facing the plug element, preferably has a particularly flat end face, which has a diameter that is at most 1 mm, preferably at most 0.5 mm, preferably at most 0.1 mm, preferably at most 0.06 mm, smaller as a plug diameter of an opposite plug cross-sectional region of the plug element, when installed in the intended position. A particularly deformation-free application of the force transmission element to the plug element is thus possible.

According to a development of the invention it is provided that the force transmission element is at least partially magnetizable and/or comprises plasma nitrided stainless steel, wherein the force absorption element or the second adapter piece has the magnet, and/or that the force transmission element has the magnet and the force absorption element or the second adapter piece is at least partially magnetizable and/or comprises plasma nitrided stainless steel. Thus, the force transmission element can be designed without a magnet, whereby the force measuring device can be used flexibly without high costs. In particular, a large number of different force transmission elements with in particular different end faces can thus be mounted on the second adapter piece, wherein the costs are low and the accuracy of the force measuring device is high.

The magnet is preferably arranged in a receiving region of the lower adapter piece, which is designed to receive the force transmission element. In this case, the magnetic forces act very directly on the force transmission element and the stability in the held state of the force transmission element is high.

Alternatively or additionally, the first fastening device is at least sectionally rotationally symmetrical, in particular rotationally symmetrical, to a first fastening axis and/or the second fastening device is at least sectionally rotationally symmetrical, in particular rotationally symmetrical to a second fastening axis. This enables particularly uniform force transmissions and further prevents deformation of the plug element.

According to a further development of the invention, it is provided that the first fastening device has a positioning bolt, which is preferably at least partially cylindrical and/or at least approximately free of play, particularly preferably free of play, can be inserted into a particularly cylindrical bushing and, in the inserted state, can be fixed therein by means of a fixing element so that the force absorption element is fixed in the direction of a positioning axis of the positioning cylinder, which preferably coincides with the direction of application, by means of the fixing element. A particularly uniform application of the specimen is thus ensured, wherein in particular tilting of the force measuring arrangement relative to the specimen, in particular between the specimen and the force transmission element, is avoided. As a result, the force measurement is very precise and damage to the specimen, in particular the medical container, by the force transmission element is avoided.

The positioning axis of the positioning cylinder is preferably aligned parallel to the direction of application, wherein it particularly preferably coincides with a central axis, in particular the axis of symmetry of the positioning cylinder and/or the cylindrical bushing. This realizes a particularly exact and precise transmission of force.

According to a further development of the invention it is provided that the first fastening device is designed as a separately designed, first, in particular upper adapter piece which abuts on the force absorption element in the first force absorption region with a first, in particular flat contact surface, when installed in the force measuring arrangement in the intended position. The force absorption element can thus be mounted in a particularly simple manner in a corresponding holding element, in particular a test device holder, wherein a measurement of a force in the direction of application is not prone to errors.

The first contact surface of the first adapter piece preferably abuts flat on a first counter contact surface of the force absorption element, in particular over a large surface. The first contact surface is particularly preferably formed by an ring-shaped surface oriented perpendicular to the direction of application on a particularly lower end of the positioning cylinder, wherein the first counter contact surface is pressed against the first contact surface by means of the fixing element in the fixed state of the positioning cylinder. Both the first contact surface and the first counter contact surface are preferably aligned perpendicular to the positioning axis and/or perpendicular to the direction of application and/or are designed in a ring shape. Particularly preferably, the relative force, the direction of application and/or a central axis of the upper adapter piece, the lower adapter piece, the force absorption element, the force transmission element and/or the fixing element are axially aligned with one another.

According to a further development of the invention, it is provided that the force absorption element has an adjustment means, wherein the adjustment means is able to adjust a force absorption axis of the force absorption element, which in a loaded state coincides with an orientation of the relative force. Tilting and obliquely aligned components can thus be corrected along the application path. As a result, the accuracy of the force measuring device is high.

In this case, the first counter contact surface is preferably tiltable by means of the adjustment means relative to the force absorption axis of the force absorption element, which preferably corresponds to the central axis and/or is aligned parallel to the direction of application. As a result, the orientation of the force absorption element can be adjusted relative to the force measuring device, so that even minimal, possibly construction-related deviations in the alignment of the direction of application relative to the center axis of the force absorption element and/or the relative force can be easily corrected by means of the adjustment means.

The adjustment means is preferably formed by at least one, in particular three screws, so that a three-point contact is formed here, the at least one screw tilting the first counter contact surface, which is preferably designed as an upper plate cover in particular, relative to the second counter contact surface. The second counter contact surface is preferably arranged on the side of the force absorption element opposite the first counter contact surface.

Preferably, in the contact region in which the second adapter piece abuts on the second force absorption region, the second counter contact surface is formed, which is preferably designed perpendicular to the direction of application and flat. The adjustment means is preferably designed in such a way that the first counter contact surface can be aligned parallel to the second counter contact surface by means of the adjustment means. This creates a particularly straight force transmission, so that the accuracy of the force measuring device is high.

According to a further development of the invention it is provided that at least one shim washer can be arranged, in particular is arranged, between the force absorption element and the force transmission element in such a way that an overall length of the force measuring arrangement can be matched to an engagement height and/or a length of a medical hollow body provided for reception in the force measuring device. As a result, the force measuring device can be used particularly flexibly and different types of medical hollow bodies can be measured without the need to change the force measuring device as a whole, in particular the force transmission element and/or the adapter pieces.

If the second adapter piece is provided, the shim washer can preferably be arranged between the second adapter piece and the force absorption element so that a distance between them can be matched to the engagement height and/or the length of the medical hollow body.

At least two force absorption elements are preferably arranged in the force measuring device, in particular parallel to one another, wherein a first force absorption element is designed by means of the at least one shim washer to penetrate a medicament container with a first length and moving a plug therein, and wherein a second force absorption element is designed by means of at least one further or no shim washer to engage in a medicament container with a second length.

The object is also achieved in particular by creating a force measuring device which has at least one force measuring arrangement according to one of the embodiments described above, a force measuring device, in particular a force measuring tower, and at least one, preferably three specimen receptacles, wherein the force measuring arrangement has at least one force absorption element, preferably three such force absorption elements wherein the at least one force absorption element is fastened to the force measuring device by means of at least one first fastening device, the at least one specimen receptacle is each designed to receive a specimen, and wherein the force measuring device is designed to use a force transmission element of the force measuring arrangement to use a force transmission element of the force measuring arrangement to apply the test parameter to each specimen and/or to measure a force counteracting the test parameter by means of the force absorption element. This results in the advantages already mentioned above in connection with the force measuring arrangement.

The object is also achieved in particular by creating a method for force measurement with a force measuring arrangement according to one of the previously described embodiments or a force measuring device according to the previously described embodiment, wherein a test parameter, in particular a test force or a test speed, is entered into the force absorption element via the first and/or the second force absorption region, wherein the test parameter is applied to the specimen, in particular to the end plug in the medical hollow body, and a resistance force of the specimen is determined, in particular as a function of the test parameter and the relative force that is measured in the force measuring arrangement, in particular in the force absorption element. Such a method is very precise and not susceptible to tilting by means of the force measuring arrangement according to one of the embodiments described above.

According to a further development of the invention, it is provided that the force transmission element penetrates at least partially into an internal volume of the specimen, in particular into a medical hollow body, wherein preferably a plug element of the specimen is acted on. The resistance force of the plug element of the specimen can thus be determined by means of the method.

According to a further development of the invention it is provided that, in order to determine the resistance force, a gravity acting on the second force absorption region, in particular a gravity of the force transmission element and/or the lower adapter piece, is taken into account in terms of control technology, in particular by taring the device. Such consideration of the force of gravity is particularly uncomplicated, can be used flexibly and does not require any additional structural measures; in particular, it is possible to dispense with pre-loading the force absorption element or the force absorption regions in opposite directions relative to each other in opposition to the force of gravity and with amounts which are equal to the amount of the force of gravity.

The object is also achieved in particular by creating an adapter piece for a force measuring arrangement according to one of the embodiments described above, wherein the adapter piece is designed as a second adapter piece and thus as a second fastening device for the force measuring arrangement and has a magnet which is designed around a force transmission element to hold the force measuring arrangement on a second force absorption region of the force measuring arrangement. This results in the same advantages mentioned above in connection with the method and the force measuring arrangement and the force measuring device.

In particular, the second adapter piece, when mounted in the force measuring arrangement, forms flat contact surfaces with the force absorption element on the one hand and/or with the force transmission element on the other, which are oriented perpendicular to the direction of application. Particularly preferably, no further, in particular no uneven, contact surface is formed between the force absorption element and the force transmission element.

The descriptions of the force measuring arrangement, the force measuring device, the method and the adapter piece are to be understood as complementary to one another. In particular, features of the force measuring arrangement, the force measuring device and/or the adapter piece that have been explicitly or implicitly described in connection with the method are preferably individual features of the force measuring arrangement, the force measuring device and/or the adapter piece or features combined with one another. The force measuring arrangement, the force measuring device and/or the adapter piece are preferably designed to carry out at least one of the method steps described in connection with the method. Method steps that have been explicitly or implicitly described in connection with the force measuring arrangement, the force measuring device and/or the adapter piece are preferably individual steps of a preferred embodiment of the method or steps in combination with one another. In particular, within the scope of the method, at least one step is preferably provided that results from at least one feature of the force measuring arrangement, the force measuring device and/or the adapter piece.

The invention will be explained in more detail below with reference to the drawing. In the drawings:

FIG. 1 is a force measuring device with a force measuring arrangement according to a first embodiment, FIG. 2 is a lower adapter piece with a magnetically held force transmission element of a force measuring arrangement according to a second embodiment, FIG. 3 is a force measuring arrangement according to the second embodiment without a force transmission element, and FIG. 4 is the force measuring arrangement according to the second embodiment without a force transmission element in a partial sectional side view.

FIG. 1 is a force measuring device 1 in a front view. The force measuring device 1 comprises a force measuring arrangement 3, a force measuring tower 5, a slide part 7, a specimen holder 9, a control device 11 and a further holder 13 by means of which the force measuring arrangement 3 is held on the slide part 7 of the force measuring tower 5.

The force measuring arrangement 3 is preferably designed to apply a test parameter to a specimen held in particular in the specimen holder 9 and/or to measure a resistance force applied by the specimen. The force measuring arrangement 3 has at least one force absorption element 25, a first fastening device and a force transmission element 27, wherein the force absorption element 25 is fastened in a movable manner by means of the first fastening device to a force measuring device, here in particular by means of the slide part 7 on the force measuring tower 5. The force absorption element is designed to measure a relative force acting between two force absorption regions, namely a first force absorption region and a second force absorption region 51. In addition, the first fastening device can be connected in a force-transmitting manner via the first force absorption region with the force absorption element 25 and the second force absorption region 51 with the force transmission element 27 by means of a second fastening device, which is designed here in particular as a second, lower adapter piece 29. The force transmission element 27 is designed here to apply the test parameter to the specimen. In this case, the second fastening device has a magnet 37 which is designed to hold the force transmission element 27, at least in a state that is connected to the second force absorption region 51 in a force-transmitting manner.

The force measuring arrangement 3 is here fastened to the further holder 13 by means of the first fastening device, which is designed here as a first, in particular upper adapter piece 15, in that a cylindrical positioning cylinder (not visible here) is passed through a correspondingly cylindrically designed bushing in the further holder 13 and has a thread 19 at its upper end 17, by means of which it is held on the holder 13 by screws, in particular by means of a groove nut 21. By means of the groove nut 21, it is fixed to the further holder 13 and thus to the force measuring tower 5 or the slide part 7 in such a way that the upper adapter piece 15 is rigidly connected to the slide part 7 in the vertical and horizontal direction. At a lower end 23 of the upper adapter piece 15 opposite the upper end 17, the upper adapter piece 15 is firmly connected in a force-transmitting manner to the first force absorption region of the force absorption element 25. The force absorption element 25 is designed here in particular as a rectangular load cell. This is designed for measuring the relative force acting between the first force absorption region and the opposite second force absorption region 51, seen here in the vertical direction.

The relative force is brought about by the force measuring arrangement 3 being moved downwards on the force measuring tower 5 by means of the slide part 7 until the force transmission element 27, which is fastened to the second force absorption region by means of force transmission by means of the second, in particular lower adapter piece 29, abuts to the specimen forming a resistance, here in particular a non-illustrated plug element of a medical container 31. The lower adapter piece 29 thus serves as a second fastening device in particular, which connects the force transmission element 27 designed to act on the specimen with the second force absorption region of the force absorption element 25 in terms of force transmission, so that the relative force can be measured by the force absorption element 25.

The force transmission element 27 is designed here in particular as a ram which has a flat application surface 33 at its lower end, which extends perpendicular to the direction of application B. The direction of application coincides here with a central, common center axis M, which extends centrally through the force transmission element 27, the lower adapter piece 29, the force absorption element 25 and the upper adapter piece 15. As a result, particularly uniform loading forces are brought about between the force transmission element 27 and the plug element of the medical container 31, so that the measurement accuracy is very high. In addition, the force measuring arrangement 3 is aligned in such a way that the central axis M also coincides with a central axis of the plug element and/or the medical container 31, whereby the measurement accuracy is also high.

In order to avoid deformation and thus an uneven and falsified resistance force of the plug element, the application surface 33 is almost as large as the opposite surface of the plug element in the medical container 31, which surface preferably corresponds to an inner cross-sectional surface of the medical container 31. The application surface 33 is preferably not more than 1 mm, preferably not more than 0.5 mm smaller, preferably not more than 0.1 mm smaller, preferably not more than 0.06 mm smaller than the opposite surface of the plug element and/or the internal cross-sectional region.

In FIG. 2, the lower adapter piece 29 and the force transmission element 27 attached to it is shown in a longitudinal section. In order to hold the force transmission element 27 on the lower adapter piece 29 and thus on the force absorption element (not shown here), the lower adapter piece 29 has a magnet 37 at its lower end 35 facing the force transmission element 27. The magnet 37 attracts the force transmission element 27, which preferably comprises or consists of plasma nitrided stainless steel in the region adjacent to the magnet in the axial direction, in such a way that the force transmission element 27 at its upper end 39 together with the lower adapter piece 29 forms a circular ring-shaped, flat contact surface 41. The lower adapter piece 29 here has a flat support surface on which the force transmission element 27 is supported with a correspondingly flat counter-support surface, whereby the circular ring-shaped, flat contact surface 41 is formed, so that the force measuring arrangement 3 measures force with high accuracy.

In addition, it can be clearly seen in FIG. 2 that the force transmission element 27 is designed to be narrower in a central region 43, that is between the application surface 33 and the circular ring-shaped contact surface 41, than at the end having the application surface 33. Because the force transmission element springs back radially in this region, the risk of tilting and/or damage to the medical container 31 is reduced, when the force transmission element 27 is inserted into the medical container 31. Preferably, a radius of the force transmission element 27 is reduced from the application surface 33 to the circular ring-shaped contact surface 41 directly behind the application surface 33, so that the application surface 33 is created by a conical section of the force transmission element 27.

A tilt-proof abutment is formed by the circular ring-shaped contact surface 41, so that measurement errors are avoided when the force is measured.

In order to fix the force transmission element 27 with respect to the adapter piece 29 in the radial direction relative to the central axis M, the adapter piece 29 has a pin-shaped extension 45, which is preferably cylindrical and has the magnet. This extension 45 is designed to engage in a correspondingly oppositely shaped recess 47 of the force transmission element 27. Preferably, clearance between the extension 45 and the recess 47 is limited to a minimum, in particular to less than 0.1 mm, preferably less than 0.05 mm, so that tilting and the resulting evasive movements of the force transmission element 27 are avoided when the test force is applied.

FIG. 3 shows the force measuring arrangement 3 without a force transmission element 27 in a perspective illustration, wherein the force measuring arrangement 3 is not attached to the force measuring tower 5.

The force measuring arrangement 3 according to the second embodiment, which is shown in FIG. 3, also has an upper adapter piece 15 and a lower adapter piece 29 in addition to the central force absorption element 25. Here, too, the upper adapter piece 15 serves as a first fastening device in order to connect the first force absorption region of the force absorption element 25, which is arranged in FIG. 3 on the side of the force absorption element 25 facing away from the viewer, to the force measuring device in a force-transmitting manner. For this purpose, the upper adapter piece 15 has a positioning cylinder 49, which can be passed through a bushing for fixing and can be fixed to the holder 13 by screwing, in particular by means of the groove nut 21. In this regard, the force measuring arrangement 3 according to the second embodiment corresponds to the force measuring arrangement 3 according to the first embodiment.

The lower adapter piece 29 serves here as a second fastening device in order to connect the second force absorption region 51 to the force transmission element 27 which is not mounted in FIG. 3, in a force-transmitting manner. For this purpose, the lower adapter piece 29 rests on the force absorption element 25 in such a way that a flat contact surface, which extends perpendicular to the central axis, is formed between the force absorption element 25 and the lower adapter piece 29. At the end of the lower adapter piece 29 facing the viewer, the magnet 37 can also be seen in FIG. 3, which is designed to hold the force transmission element 27 together with the cylindrical extension 45 of the lower adapter piece 29.

In order to axially align the upper adapter piece 15 with the lower adapter piece 29, the force measuring device has an adjustment means which comprises at least one adjustment screw. In the embodiment shown in FIG. 3, the at least one adjustment screw is arranged on the side of the force absorption element 25 facing away from the viewer, that is to say facing the upper adapter piece 15. Three adjustment screws are preferably arranged here, which are arranged in the circumferential direction at equal distances from one another along a circumferential line of the upper cover plate 53, analogous to the arrangement of the three visible screws 55. This at least one adjustment screw can be used to adjust an inclination of the upper cover plate 53, in particular the first force absorption region, relative to the central axis M and thus relative to the second force absorption region and the lower adapter piece 29 and, in the mounted state, the force transmission element 27. The upper adapter piece 15 abuts on the upper cover plate 53 flatly on the side facing away from the viewer and forms a further circular ring-shaped contact surface there, which can be seen in the partial sectional view in FIG. 4 and which is formed by a first contact surface 56 of the upper adapter piece 15 and a first counter contact surface 57 of the force absorption element 25.

As can be seen in FIG. 4, the upper adapter piece 15 is fastened, preferably screwed, to a cylindrical extension 59 of the force absorption element 25. Thus, the upper adapter piece 15 is firmly held on the force absorption element 25, whereby the additional circular ring-shaped contact surface ensures a high level of accuracy of the force measuring arrangement in that the axial alignment of the upper adapter piece 15 on the lower adapter piece 29 is not susceptible to failure.

Particularly preferably, all contact, abutment and/or counter contact surfaces along the force action chain from the upper adapter piece via the force absorption element 25 via the lower adapter piece 29, the force transmission element 27 to the specimen, in particular the plug element of the medical container 31, are designed to be flat and extend perpendicular to the central axis M. In particular, the circular ring-shaped contact surface 41 between the lower adapter piece 29 and the force transmission element 27, the application surface 33 of the force transmission element 27, the first counter contact surface 57 of the force absorption element 25, a second counter contact surface 61 of the force absorption element 25 in the second force absorption region 51 and two further contact surfaces 63 between the upper adapter piece 15 or the ring nut 21 on the one hand and the further holder 13 on the other hand are circular ring-shaped, symmetrical to the central axis M, parallel to one another and/or flat, wherein the further contact surfaces 63 preferably each extend perpendicular to the central axis M. In addition to these mentioned contact surfaces, no further contact surfaces are preferably formed in the direction of the central axis. Thus, a force measuring arrangement 3 that is particularly immune to errors is created, by means of which forces acting on a specimen and the resistance forces originating from it can be measured very precisely.

In addition, between the force absorption element 25, in particular between the second force absorption region 51 and the force transmission element 27 and/or the specimen, when installed in the force measuring device 1 in the intended position, there are no threads for screwing the elements to one another and, in the radial direction to the central axis M, no round contact surfaces are formed. This brings about a particularly precise force measurement and the mounting of the force transmission element 27 can be carried out quickly and easily.

The invention claimed is:

1. A force measuring arrangement (3) in particular for applying a test parameter to a specimen and/or for measuring a resistance force applied by the specimen, having at least one force reception element (25), a first fastening device and a force transmission element (27), wherein the force reception element (25) can be displaceable fastened to a force measuring device by means of the first fastening device, wherein the force reception element (25) is designed to measure a relative force acting between two force reception regions, namely a first force reception region and a second force reception region (51), wherein the first fastening device is able to be connected to the force reception element (25) force transmissively via the first force reception region, wherein the second force reception region (51) is able to be connected to the force transmission element (27) force transmissively by means of a second fastening device, wherein the force transmission element (27) is designed to apply a test parameter to a specimen, characterized in that the second fastening device has a magnet (37) that is designed to retain the force transmission element (27), at least in a state connected to the second force reception region (51) force transmissively.

2. The force measuring arrangement according to claim 1, characterized in that the second fastening device is designed as a separately designed, second adapter piece (29).

3. The force measuring arrangement according to claim 2, characterized in that the force transmission element (27) is at least partially magnetizable and/or comprises plasma nitrided stainless steel, wherein the force reception element (25) or the second adapter piece (29) has the magnet, and/or that the force transmission element has the magnet and the force reception element or the second adapter piece is designed to be magnetizable at least in some regions and/or comprises plasma nitrided stainless steel.

4. The force measuring arrangement according to claim 1, characterized in that the force transmission element (27) is pushed against a support surface of the force measuring arrangement (3) by means of the magnet (37).

5. The force measuring arrangement according to claim 1, characterized in that the specimen is designed as a medical hollow body having a plug element and the force transmission element (27) is designed to at least partially penetrate into an internal volume of the medical hollow body, and to act on the plug element therein preferably in the direction of the application direction (B).

6. The force measuring arrangement according to claim 5, characterized in that the force transmission element has a longitudinal extent which, together with a longitudinal extent of the plug element, is matched to a longitudinal extent of the inner volume or is greater than this.

7. The force measuring arrangement according to claim 1, characterized in that the first fastening device has a positioning bolt (49) which can be inserted into a bushing and, in the inserted state, can be fixed therein by means of a fixing element, in particular a groove nut (21), in such a way that the force reception element (25) is fixed in the direction of a positioning axis of the positioning bolt (49) by means of the fixing element.

8. The force measuring arrangement according to claim 1, characterized in that the first fastening device is designed as a separately designed, first adapter piece (15) which abuts on the force reception element (25) in the first force reception region with a first contact surface, when installed in the force measuring arrangement (3) in the intended position.

9. The force measuring arrangement according to claim 1, characterized in that the force reception element (25) comprises an adjustment means, wherein a force-reception axis of the force reception element (25), which in a loaded state coincides with an orientation of the relative force, can be adjusted by means of the adjustment means.

10. The force measuring arrangement according to claim 1, characterized in that at least one shim can be arranged between the force reception element (25) and the force transmission element (27) in such a way that a total length of the force measuring device (3) can be adapted to an engagement height and/or a length of a medical hollow body which is provided to be received in the force measuring device.

11. A force measuring apparatus (1) characterized by at least one force measuring arrangement (3) according to claim 1, a force measuring device, in particular a force measuring tower, and at least one specimen receptacle, wherein the force measuring arrangement (3) comprises at least one force reception element (25), wherein the at least one force reception element (25) is fastened to the force measuring device by means of at least one first fastening device, wherein the at least one specimen receptacle (9) is each designed to hold a specimen, and wherein the force measuring apparatus (1) is designed to use the force transmission element (27) of the force measuring arrangement (3) to apply the test parameter to the respective specimen and/or to measure a force counteracting the test parameter by means of the force reception element (25).

12. A method for measuring a force with a force measuring arrangement (3) according to claim 1, with the following steps:

Introducing the test parameter into the force reception element (25) via the first and/or the second force reception region (51), applying the test parameter to the specimen, and determining a resistance force of the specimen.

13. The method according to claim 12, characterized in that the force transmission element (27) penetrates at least partially into an internal volume of the specimen, wherein a plug element of the specimen preferably is applied.

14. The method according to claim 12, characterized in that, in order to determine the resistance force, a gravity acting on the second force reception region (51) is taken into account for controlling.

15. An adapter piece for a force measuring arrangement according to claim 1, characterized in that the adapter piece is designed as a second adapter piece and second fastening device for the force measuring arrangement (3) and has a magnet which is designed to hold a force transmission element (27) of the force measuring arrangement (3) on a second force reception region of the force measuring arrangement (3).

* * * * *